(12) United States Patent
Duckworth, Jr.

(10) Patent No.: US 11,495,138 B2
(45) Date of Patent: Nov. 8, 2022

(54) SHOE TYING DEVICE

(71) Applicant: Percy S. Duckworth, Jr., Shorewood, WI (US)

(72) Inventor: Percy S. Duckworth, Jr., Shorewood, WI (US)

(*) Notice: Subject to any disclaimer, the term of this patent is extended or adjusted under 35 U.S.C. 154(b) by 307 days.

(21) Appl. No.: 16/922,061

(22) Filed: Jul. 7, 2020

(65) Prior Publication Data

US 2022/0013037 A1 Jan. 13, 2022

(51) Int. Cl.
*G09B 19/00* (2006.01)
(52) U.S. Cl.
CPC ................ *G09B 19/0076* (2013.01)
(58) Field of Classification Search
CPC .................................................. G09B 19/0076
USPC ............................................................ 434/260
See application file for complete search history.

(56) References Cited

U.S. PATENT DOCUMENTS

| 4,342,557 | A | 8/1982 | Bandar |
| 5,897,323 | A | 4/1999 | Stanfield |
| 6,382,981 | B1 | 5/2002 | Stanfield |
| 6,641,403 | B1 | 11/2003 | Bavasso |
| 6,872,079 | B1 * | 3/2005 | Herndon ............ G09B 19/0076 434/258 |
| 9,427,045 | B1 * | 8/2016 | Hannon ................... A43C 7/00 |
| 2010/0269373 | A1 | 10/2010 | Pirkle et al. |
| 2014/0115842 | A1 | 5/2014 | Sloan |
| 2014/0308641 | A1 | 10/2014 | Tebben et al. |
| 2017/0006970 | A1 * | 1/2017 | Hastings .................. A43C 1/06 |
| 2017/0290392 | A1 * | 10/2017 | Schreiner ................ A43C 7/00 |

* cited by examiner

*Primary Examiner* — Robert P Bullington, Esq.
(74) *Attorney, Agent, or Firm* — Boyle Fredrickson S.C.

(57) ABSTRACT

A shoe tying device that includes a female member having a first female member end, a second female member end, at least one female engagement section, and two cut-out portions. The shoe tying device further includes a male member having a male member top face, a first male member end, and a second male member end. The male member includes two pillars that project from the male member top face, at least one male engagement member that extends from the first male member end of the male member, and two cut-out portions that extend from the first male member end towards the second male member end. The at least one female engagement section and the at least one male engagement section selectively engageable each other creating an opening from the alignment of the cut-out portions of the of the female member and the cut-out portions of the male member.

16 Claims, 9 Drawing Sheets

SHOE TYING DEVICE

FIELD OF THE INVENTION

The preferred embodiments relate to a shoe tying device, more specifically the invention relates to a two-part shoe tying device and a method for using the same.

BACKGROUND

Although people tie their shoelaces every day, initially learning how to tie shoelaces can be difficult for children or disabled persons. Tying shoelaces can also be difficult as a person ages due to a loss of dexterity in his or her hands. While there are shoe tying devices already known, current devices include several apertures and require complicated movements to remove the shoe tying device from the shoe making the device intimidating and difficult to use. Other shoe tying devices are not removable from the shoe once the shoelaces are tied, making it obvious to other people that the person has used the device. A need therefore exists for an efficient, easy to use, removable shoe tying device able to assist children and disabled persons in learning how to tie their shoelaces as well as suitable for aiding elderly persons to tie their own shoelaces.

SUMMARY OF THE INVENTION

The preferred embodiments overcome the drawbacks of previous shoe tying devices by providing a stable two-piece lockable design that is easy to use and easy to remove, if the user wishes. The shoe tying device that includes a female member and a male member. The female member has a first female member end and a second female member end. The female member further includes at least one female engagement section and two cut-out portions that extend from the first female member side towards the second female member side. The male member, on the other hand, includes a male member top face, a first male member end, and a second male member end. The male member includes two pillars that project from the male member top face, at least one male engagement member that extends from the first male member end of the male member, and two cut-out portions that extend from the first male member end towards the second male member end. The at least one female engagement section and the at least one male engagement section selectively engageable each other to form an opening from the alignment of the cut-out portions of the of the female member and the cut-out portions of the male member.

An aspect of the present invention includes pillars that further include a cantilever portion to hold the loops of the shoelaces in place when using the shoe tying device.

A further aspect of the present invention is that the male member includes three at least one male engagement sections, while the female member includes three at least one female engagement sections.

An additional aspect of the invention includes the shoe tying device having rounded corners.

Another aspect of the present invention includes the cut-out portions of the male and female members all being concave.

BRIEF DESCRIPTION OF THE FIGURES

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION OF THE FIGURES

The present invention and the various features and advantageous details thereof are explained more fully with reference to the non-limiting embodiments described in detail in the following description.

Figure 1:
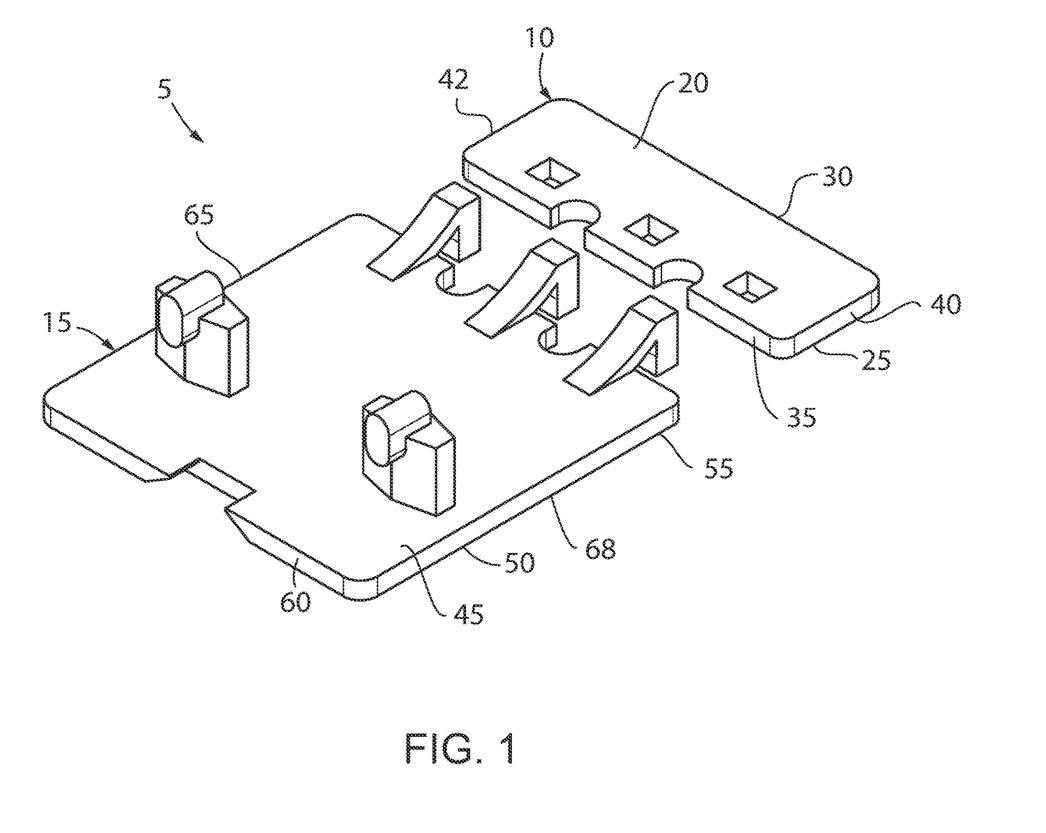
FIG. 1 is a perspective view of a shoe tying device in a detached position.

FIG. 1 illustrates a shoe tying device 5 which has a female member 10 and a male member 15. In a representative embodiment, the female member 10 includes a female member top face 20 and a female member bottom face 25, located and positioned on the opposite face, side, or plane from the female member top face 20. The female member 10 further includes an outer side or first female member end 30 and an inner side or second female member end 35, located and positioned on the opposite side from the first female member end 30. The female member 10 also includes female member sidewalls 40 and 42, extending between the first female member end 30 and second female member end 35. Likewise, the male member 15 includes a male member top face 45 and a male member bottom face 50. The male member 15 also includes a first male member end 55, a second male member end 60, and male sidewalls 65 and 68 extending between the first and second male member ends 55 and 60. In the illustrated embodiment, both the female member 10 and male member 15 are a rectangular-like shape, with rounded corners for safety. In other embodiments, however, the female member 10 and male member 15 may be other shapes.

Figure 2:
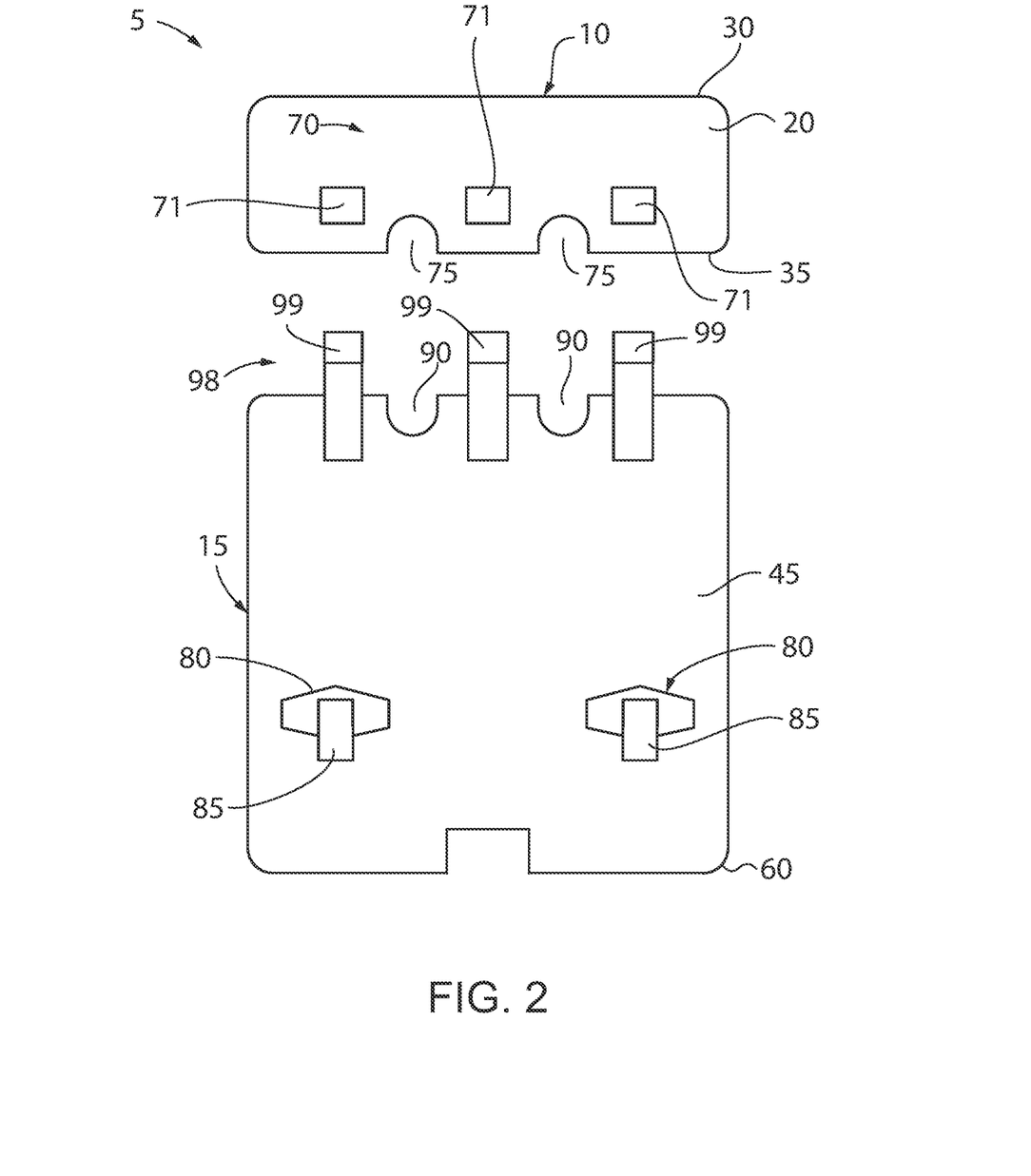
FIG. 2 is a plan view of the shoe tying device of FIG. 1.
Figure 3:
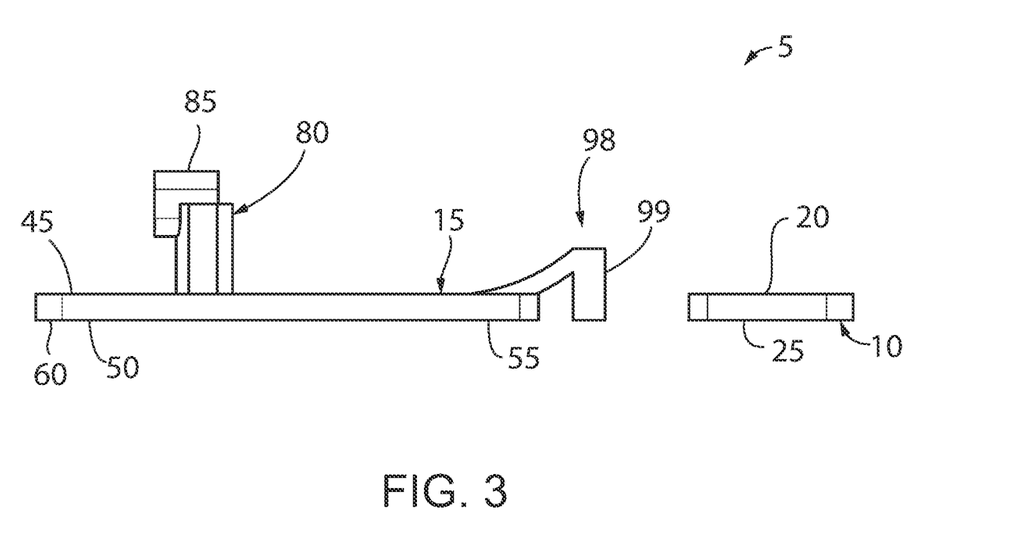
FIG. 3 is a side elevation view of the shoe tying device of FIGS. 1 and 2.

Turning to FIGS. 2 and 3, the female member 10 further includes at least one female engagement section 70, which may be one or more indentations, slots, slits, openings or apertures 71. The at least one female engagement section 70 may be located towards the second female member end 35. In embodiments where the female engagement section 70 is an aperture, the at least one female engagement section 70 extends through the shoe tying device 5, from the female member top face 20 to the female member bottom face 25. Alternatively, the at least one female engagement section 70 may be an indentation located on the female member top face 20 and extends towards the female member bottom face 25. Other types and shapes of female engagement sections 70 are envisioned and foreseeable. The female member 10 may further include at least two concave portions, indentations, or wave-like portions, or cut-outs 75 at the second female member end 35. The cut-outs 75 are located and positioned at the second female member end 35 and extend towards the first female member end 30.

Figure 4:
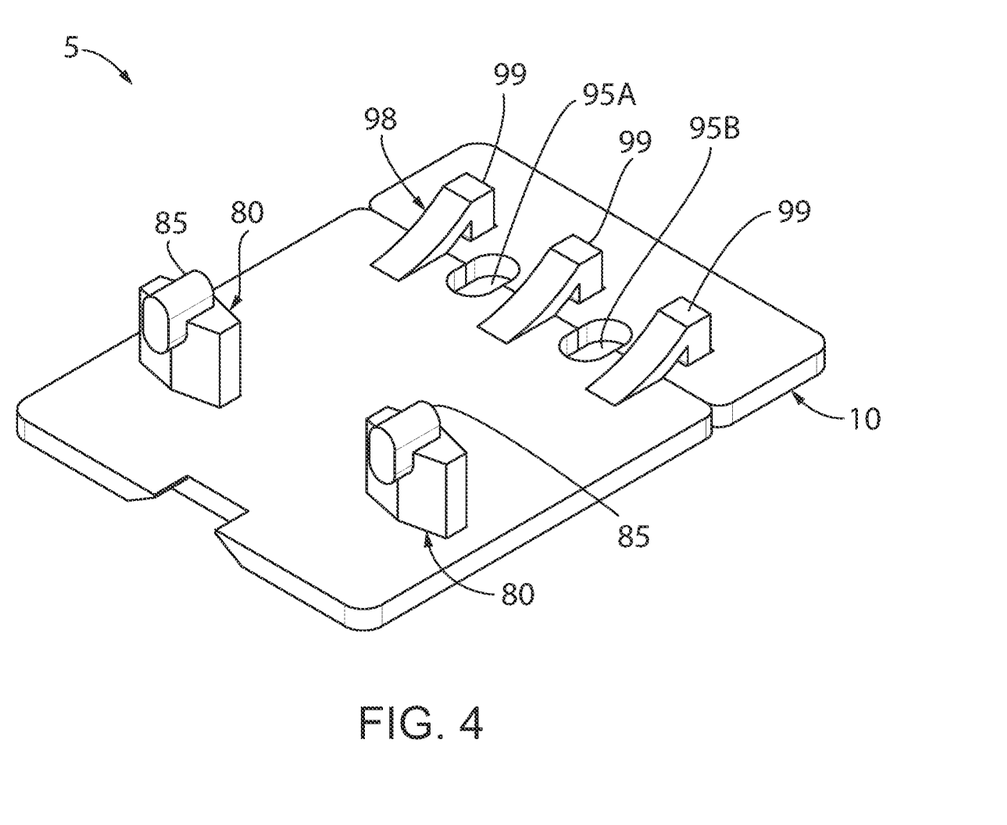
FIG. 4 is a perspective view of the shoe tying device of FIGS. 1-3 in an engaged position.

The male member 15 of the shoe tying device 5, as shown in FIGS. 2 and 3, includes at least two pillars, columns, or projections 80 that are spaced apart from each other, project away from the male member top face 45, and may be located towards the second male member end 60 of the male member 15. The pillars 80 may include a cantilever portion, angled portion, or overhang portion 85 spaced apart from the male member top face 45 and extends towards the second male member end 60. The pillar 80 and cantilever portion 85 therefore may create a hook-like structure. The male member 15 also includes at least two concave portions, indentations, or wave-like portions, or cut-outs 90 at the first male member end 55 and each cut-out 90 extends towards the second male member end 60. The cut-outs 90 of the male member 15 align with the cut-outs 75 of the female member 10 to form an aperture or opening 95A and 95B (shown in FIG. 4) when the male member 15 and the female member 10 are selectively engaged, as will be explained in more detail hereinafter. The male member 15 further includes at least one male engagement section 98. The at least one male engagement section 98 may be one or more arm or hook members 99 located and positioned at and extending away from the first male member end 55. The at least one male engagement section 98 corresponds to and is shaped and sized to be inserted into the at least one female engagement section 70 of the female member 10 thereby allowing the male member 15 and female member 10 to be selectively engage in a hooking engagement as seen in FIG. 4. An arm 101 of the male engagement section 98 may be rigid or slightly flexible with spring-like properties to secure the female and male members 10, 15, respectively. For instance, in alternative embodiments, the at least one female section 70 and the at least one male engagement section 98 may be different structures allowing the at least one female engagement section 70 to engage the at least one male engagement section 98 through a snap engagement or a friction engagement. Additional engagement methods are envisioned and foreseeable.

Figure 5:
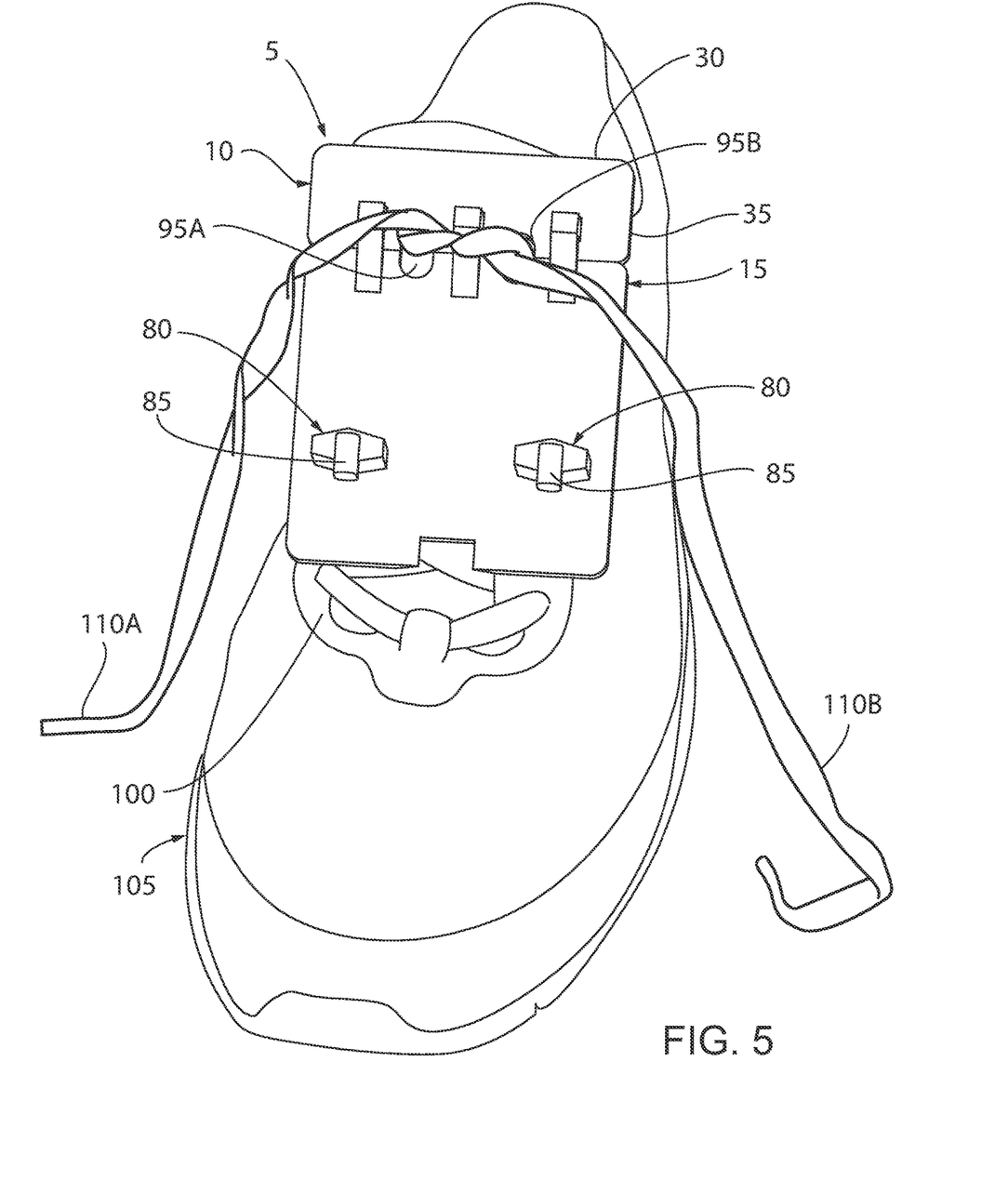
FIG. 5 is a perspective view of an initial step of a method of using the shoe tying device of FIGS. 1-4.
Figure 6:
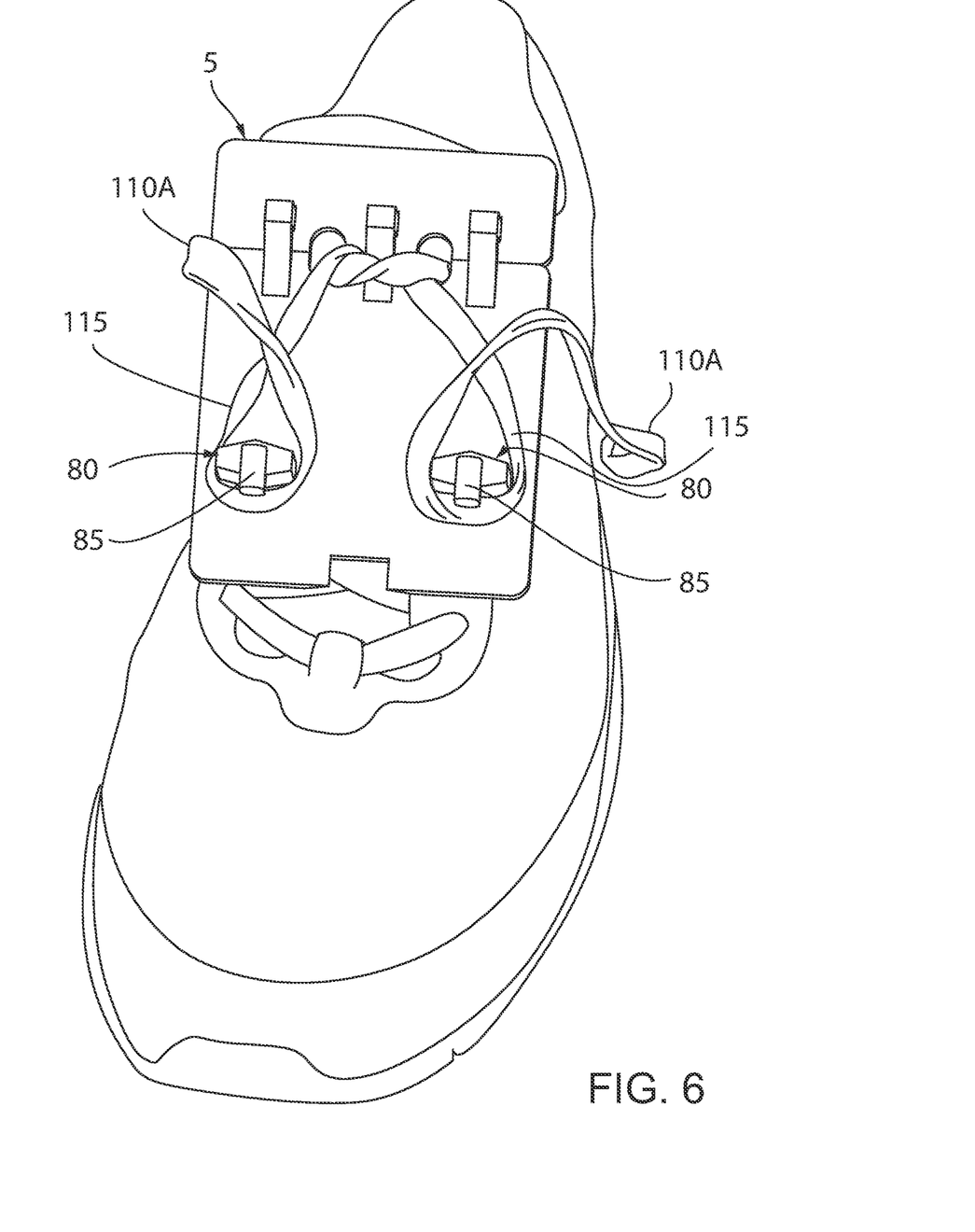
FIG. 6 is a perspective view of a first intermediate step of the method of FIG. 5.
Figure 7:
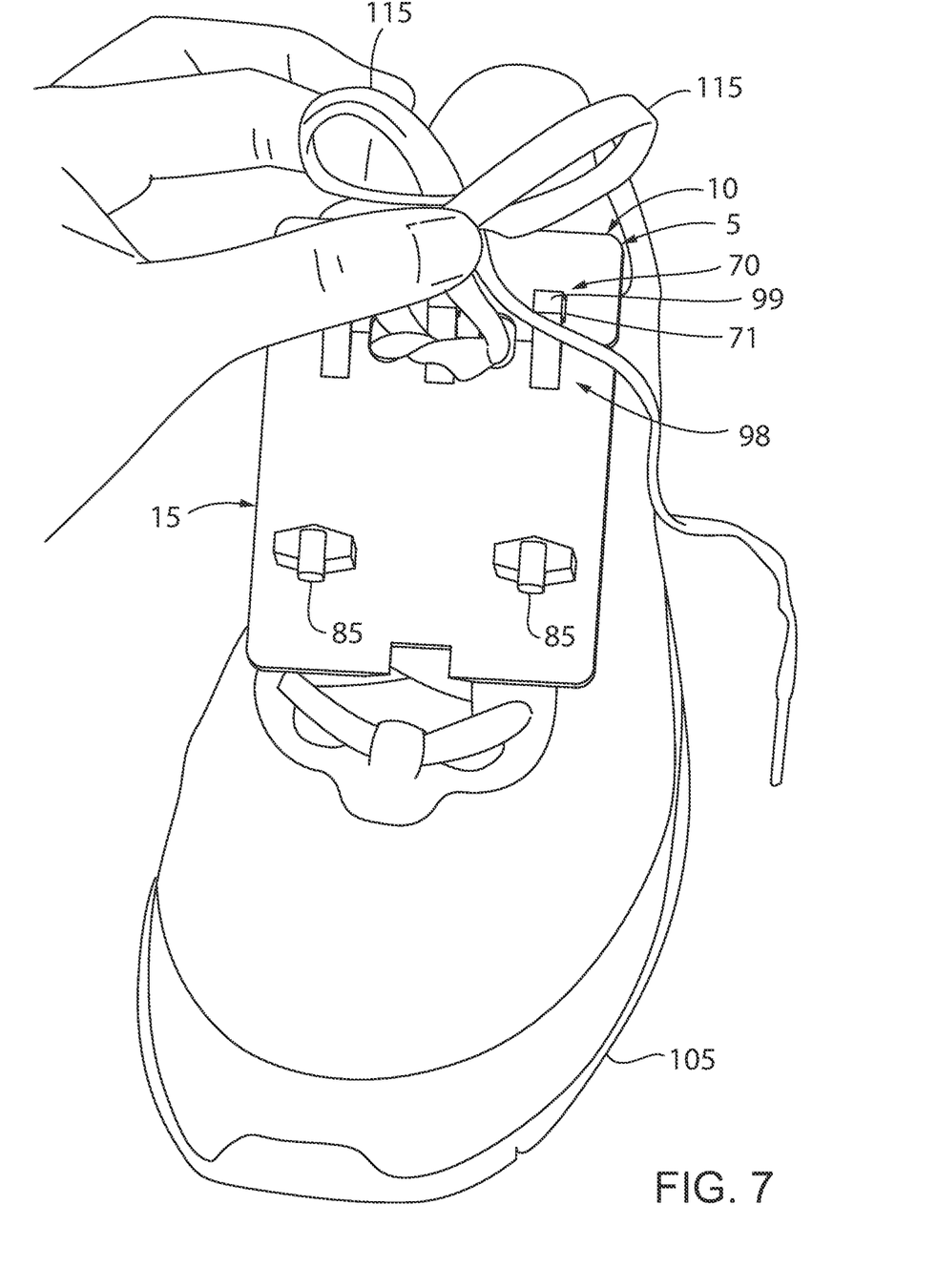
FIG. 7 is a perspective view of a second intermediate step of the method of FIGS. 5 and 6.
Figure 8:
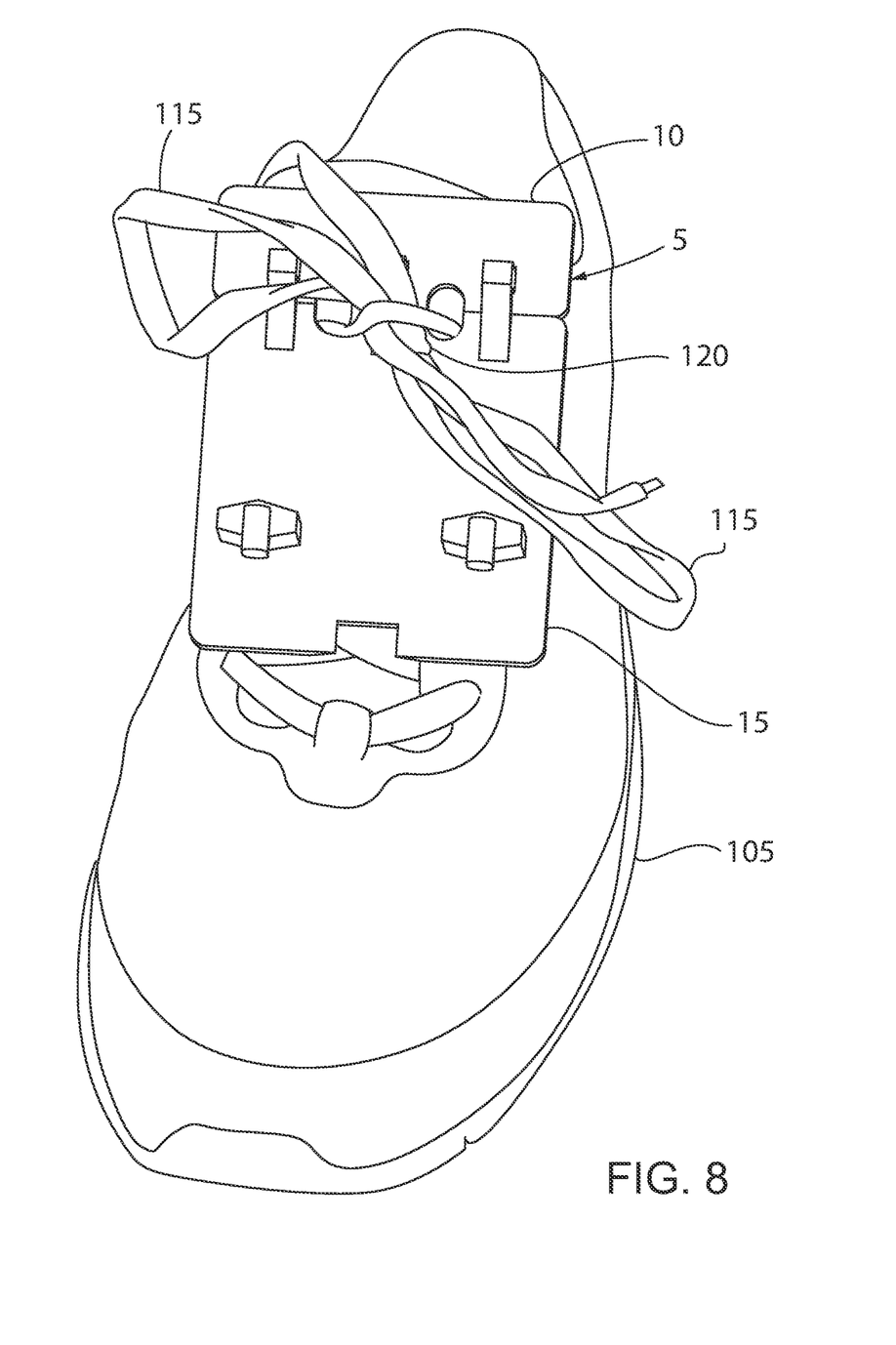
FIG. 8 is a perspective view of an end step of the method of FIGS. 5-7.
Figure 9:
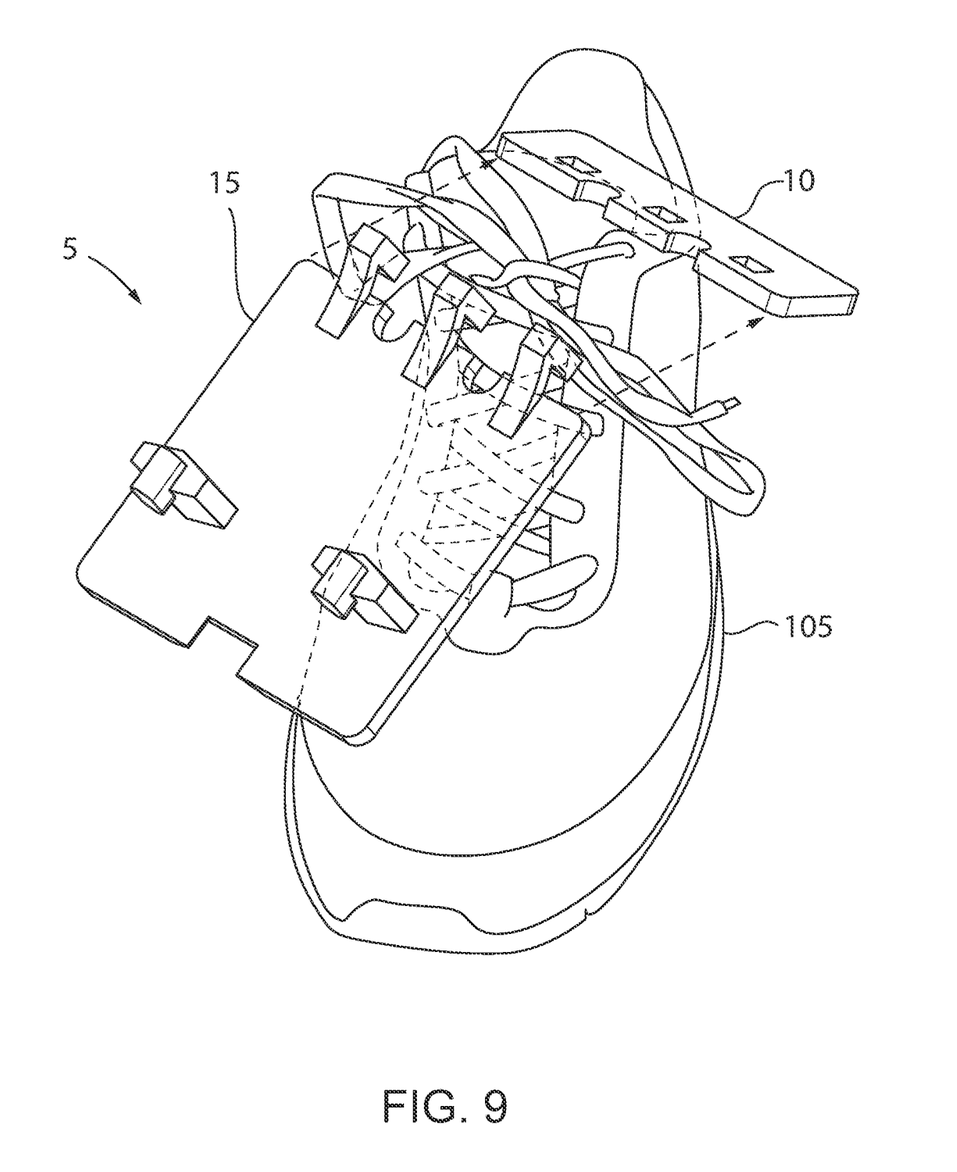
FIG. 9 is a perspective view of the user disconnecting the two-piece apparatus from the shoe.

In order to use the shoe tying device 5, the female member 10 and male member 15 should be engaged or connected to each other as illustrated in FIG. 4, and then placed onto a top portion 100 of a shoe 105 (shown in FIG. 5) so that the female member bottom face 25 and the male member bottom face 50 (shown in FIG. 3) are adjacent to and abut the top portion 100 of the shoe 105 and the first female member end 30 is closer to the ankle than the second female member end 35. Next, each shoelace 110A and 110B should be inserted into an opening 95A and 95B, respectively, in the direction of the female member bottom face 25 towards the female member top face 20 (shown in FIG. 3). Shoelaces 110A and 110B should then be crossed so that the shoelaces 110A and 110B look like an X. Tuck the top shoelace (either 110A or 110B) under the bottom shoelace (110A or 110B) and pull both shoelaces 110A and 110B so that the shoe 105 and shoe tying device 5 appears as shown in FIG. 5. Create a loop (or bunny ears) 115 in each shoelace 110A and 110B by looping or wrapping each shoelace 110A and 110B around a pillar 80. As illustrated in FIG. 6, each loop 115 is preferably created by looping each shoelace 110A and 110B around the outer side of the pillar 80 and towards the inner side of the pillar 80. The cantilever portion 85 preferably assists in retaining the loops 115 on their individual pillars 80 so that the loops 115 do not accidently slide off. Both loops 115 can then be removed from their pillars 80 and crossed so that the loops 115 form an X, as seen in FIG. 7. Next, tuck the top loop 115 under the bottom loop 115 and pull both loops 115 to form and tighten a knot 120, as shown in FIG. 8. The female member 10 and male member 15 can then be disengaged from each other to reveal a typically tied shoe 105 (FIG. 9). To do so, the user preferably rotates the two part apparatus to disconnect the fit between the two.

The shoe tying device 5 can therefore be used as an instructional and memory device when learning to tie a shoe 105, as well as assist in tying a shoe 105 when a person's hands lack dexterity. The shoe tying device can also be removed after tying a shoelace 110, which allows a person to conceal the use of the device 5. Alternatively, device 5 may be left locked on the shoe as a decorative piece. Customized colors, designs, affiliations, logos may be affixed to device 5 to facilitate marketing opportunities.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:
1. A shoe tying device comprising:
 a female member and a male member wherein the female member is selectively engageable with the male member;
 wherein the female member and the male member each include two cut-outs that together form two openings that extend through the shoe tying device when the female member and the male member are engaged; and
 wherein the male member includes at least two pillars projecting orthogonally away from a male member top face.
2. The shoe tying device of claim 1 wherein the female member and male member engage each other through a hooking engagement.
3. The shoe tying device of claim 2 wherein the female member includes at least three female engagement openings; wherein the male member includes at least three male arms having hook members to engage corresponding ones of the female engagement openings.
4. The shoe tying device of claim 1 wherein each pillar includes a cantilever portion that extends away from the female member when the shoe tying device is in an engaged position.
5. The shoe tying device of claim 1 wherein the cut-out portions are a concave-like shape.
6. A shoe tying device comprising:
 a female member and a male member;
  the female member comprising:
   a first female member end and a second female member end, the female member including at least one female engagement section and two cut-out portions, the two cut-out portions extending from the first female member side towards the second female member side;
  the male member comprising:

a male member top face, a male member bottom face, a first male member end, and a second male member end;

a first pillar projecting away from the male member top face and a second pillar also projecting away from the male member top face of the male member;

at least one male engagement member extending from the first male member end of the male member;

two cut-out portions extending from the first male member end towards the second male member end;

wherein the at least one female engagement section and the at least one male engagement section are selectively engageable; and wherein the cut-out portions of the of the female member and the cut-out portions of the male member align to form two apertures when the female member and the male member are selectively engaged.

7. The shoe tying device of claim 6 wherein the first and second pillars of the male member each include a cantilever portion.

8. The shoe tying device of claim 6 wherein the male member includes three male engagement arms and the female member includes three female engagement openings.

9. The shoe tying device of claim 8 wherein arms are rigid.

10. The shoe tying device of claim 6 wherein the cut-outs are concave.

11. A method of using a shoe tying device comprising:

place a shoe tying device including a female member and male member, locked together, onto a top portion of a shoe;

insert each shoelace into an opening of the shoe tying device;

create an X-like shape with the shoelaces and tuck one shoelace under the other;

form a loop with each shoelace by wrapping each shoelace around a pillar;

remove both loops from the pillars;

create an X-like shape with the loops and tuck one loop under the other to form a knot; and disengage the female member from the male member and remove the female member and male member from the shoe.

12. The method of claim 11 wherein the shoe tying device is positioned so that the female member of the shoe tying device is located closer to the ankle than the male member of the shoe tying device.

13. The method of claim 11 wherein each loop is formed by wrapping each shoelace from an outer side of the pillar towards an inner side of the pillar.

14. The method of claim 11 wherein each loop is retained on the pillar, until deliberately removed, by a cantilever portion that extends from the pillar.

15. The method of claim 11 wherein each shoelace is inserted into and through the opening by inserting each shoelace from a bottom direction towards a top direction.

16. The method of claim 11, wherein:

the female member comprising:
 a first female member end and a second female member end, the female member including at least one female engagement section and two cut-out portions, the two cut-out portions extending from the first female member side towards the second female member side;

the male member comprising:
 a male member top face, a male member bottom face, a first male member end, and a second male member end;

a first pillar projecting away from the male member top face and a second pillar also projecting away from the male member top face of the male member;

at least one male engagement member extending from the first male member end of the male member;

two cut-out portions extending from the first male member end towards the second male member end;

wherein the at least one female engagement section and the at least one male engagement section are selectively engageable; and wherein the cut-out portions of the of the female member and the cut-out portions of the male member align to form two apertures when the female member and the male member are selectively engaged.

* * * * *